United States Patent [19]

Malone et al.

[11] 4,430,349

[45] Feb. 7, 1984

[54] ARTIFICIALLY SWEETENED GELLED YOGURT

[75] Inventors: Michael J. Malone; Evelyn A. Miles, both of Houston, Tex.

[73] Assignee: The Coca-Cola Company, Atlanta, Ga.

[21] Appl. No.: 452,636

[22] Filed: Dec. 23, 1982

[51] Int. Cl.$^3$ .................... A23C 9/13; A23C 9/137; A23L 1/236

[52] U.S. Cl. ..................................... 426/34; 426/43; 426/548; 426/583; 426/804

[58] Field of Search ................. 426/34, 573, 583, 576, 426/577, 548, 804

[56] References Cited

U.S. PATENT DOCUMENTS 3,978,243  8/1976  Pedersen ........................... 426/583

4,289,788  9/1981  Cajigas .............................. 426/583

OTHER PUBLICATIONS

"Critical Reviews in Food Science + Nutrition", Guy A. Crosby, Jun. 1976, pp. 301-308.

"Food Product Development", R. D. McCormick, vol. 9, No. 1, Feb. 1975.

Primary Examiner—David M. Naff
Assistant Examiner—Marianne S. Minnick

[57] ABSTRACT

Gelled, artificially-sweetened yogurt is prepared by mixing a stabilizer solution containing high methoxyl pectin, low methoxyl pectin and an aspartic acid-based sweetener with prepared yogurt. The stabilizer solution is pasteurized before mixing with prepared yogurt, and may contain a calcium ion sequestering agent.

11 Claims, No Drawings

ARTIFICIALLY SWEETENED GELLED YOGURT

BACKGROUND OF THE INVENTION

Yogurt is a combination of dairy ingredients such as whole milk, partially skimmed milk, skim milk, nonfat dry milk, and the like which has been cultured to a specific acidity at high temperatures with an appropriate bacterial culture consisting of *Lactobacillus bulgaricus*, a rod-shaped lactic acid forming bacterium, and *Streptococcus thermophilus*, a coccus-shaped bacterium. Production begins with the homogenization and pasteurization of the dairy ingredients at high temperatures followed by cooling to 40° C.–50° C. for inoculation with the culture. The culture is allowed to grow and produce acid to a pH at which curdling or coagulation will occur. Acid production is slowed by cooling the mixture to a temperature between 0° C. and 5° C. The yogurt can be customized to the consumers' taste through the use of sweeteners, fruit, colorants, flavorants, and stabilizers.

Yogurts can be produced in a variety of consistencies such as firm or "gel-like", frozen, or liquid yogurts. Most yogurt presently produced in the United States is of the firm or gelled variety having a spoonable, pudding-like consistency. After a few days of standing the firm yogurt may show signs of syneresis in which a watery substance is seen on top of and around the yogurt. This "wheying off" can be eliminated by increasing the milk solids in the yogurt or by using stabilizers.

Stabilizers commercially available include plant exudates (e.g., gum arabic), seaweed extracts (e.g., alginates), plant and seed gums (e.g., guar gum), animal derivatives (e.g., gelatin) and plant extracts (e.g., pectin). These stabilizers are soluble in milk or already prepared yogurt, and may therefore, be incorporated at any stage of manufacture.

Most of the gelled or firm yogurt produced in the United States is cultured after the dairy ingredient mix, stabilizers and sweeteners are packaged into the container in which it is sold. If however, 1-methyl-N-1-alpha-aspartyl-1-phenylalanine (aspartame ®, G. D. Searle & Co., Chicago, Ill.), is used as the sweetening agent, problems arise due to the tendency of aspartame to clump and resist hydration when mixed with the ingredient mix prior to the start of the culturing reactions. In food systems such as the dairy ingredient starter mixes having a pH of above about 5.0, the aspartame will also begin to break down to diketopiperazine (DKP) causing a dramatic reduction in sweetness as described by B. K. Dwivedi in *Low Calorie and Special Dietary Foods*, C.R.C. Press, Inc., West Palm Beach, Fla. (1978) at pages 77–82. Although this by-product has a minimal effect on taste, the loss of aspartame reduces the sweetness detected in the product. Therefore, Dwivedi recommends that aspartame be added to yogurt as a dry mix of flavor and color after the cultering of the milk has been completed and the pH of the product has been sufficiently lowered.

Therefore, in order to obtain a gelled yogurt sweetened with aspartame, culturing must be conducted prior to the sweetening and packaging, and the necessary gelation or "second set" must be obtained after the sweetener and stabilizers have been mixed with the yogurt and the resultant product packaged and cooled.

Therefore, it is an object of the present invention to provide a method for sweetening yogurt with aspartame or similar artificial sweeteners so as to provide a satisfactory firm or gelled yogurt upon cooling.

It is another object of the present invention to provide a method for the production of a gelled, artificially sweetened yogurt which achieves a satisfactory "second set" after packaging and cooling.

It is still another object of the present invention to provide a method for the production of artificially sweetened, gelled yogurt which minimizes the possibility of the chemical or biological contamination to the ingredients during processing.

BRIEF DESCRIPTION OF THE INVENTION

The objects of the present invention are achieved by process for the manufacture of an artificially sweetened, gelled yogurt whereby a sterile aqueous stabilizing solution comprising low methoxyl pectin, high methoxyl pectin, an artificial sweetener such as aspartame and one or more calcium ion sequestering agents, is blended with prepared yogurt under conditions of low-pressure homogenation. The concentrations of the ingredients of the stabilizing solution are adjusted so that it will contain an amount of high methoxyl pectin effective to inhibit protein precipitation in the yogurt, an amount of low methoxyl pectin effective to gel the yogurt, an amount of calcium sequestering agent sufficient to retard the gellation of the yogurt during homogenization and packaging, and an effective sweetening amount of the sweetener.

DETAILED DESCRIPTION OF THE INVENTION

The present invention provides a method for the sweetening of a gelled yogurt with aspartame or other artificial sweeteners that are not stable at conditions maintained during the culture period of the dairy ingredients. Specifically, milk, skim milk, nonfat dry milk or mixtures thereof are blended and pasteurized at, for example, about 82° C. for 30 minutes, cooled to about 40°–45° C. and inoculated with the bacterial culture. The mix is allowed to culture for period of two to six hours without agitation until the desired amount of lactic acid has formed and the pH has fallen to about 4–5. At this point the mix may be designated as a "yogurt" or "prepared yogurt".

While milk from usual sources will be adequate for the preparation of this yogurt, its mineral content or salt balance will vary depending upon the season of the year when it was produced. For example, milk obtained during winter will have a lower salt balance and consequently will produce some graininess in the yogurt. To minimize this effect, sodium citrate may be added to the milk before culturing.

A high methoxyl pectin solution may be mixed with the yogurt at this point to produce the smooth texture needed for liquid yogurt. However, the high methoxyl pectin will not aid in gelling the yogurt, in that the pectin will only bind with the casein particles in the yogurt and prevent the separation of proteins. A gelled yogurt may be obtained through the use of low methoxyl pectin, sodium alginate, or a calcium sensitive stabilizer which may be added to the yogurt after the addition of high methoxyl pectin, as is disclosed in U.S. Pat. No. 3,978,243.

When low methoxyl pectin is utilized as the gelling agent, a calcium sequesterant is necessary to regulate the reaction rate. Low methoxyl pectin is very reactive with the calcium ions present in milk and may cause immediate curdling or coagulation of the culture into a granular pudding when added directly to yogurt. To avoid this a citric and/or phosphoric acid alkali metal salt or EDTA (ethylenediaminetetraacetic acid) may be used with the pectin in an amount effective to bind with the calcium ions in the milk and control the pH, thus slowing the reaction time.

For this purpose, sodium hexametaphosphate has been utilized as a calcium sequesterant to retard the reaction initiated when the low methoxyl pectin are added to the yogurt. The low methoxyl pectin will serve to thicken the yogurt while the sodium hexametaphosphate acts to slow the reaction so that the yogurt will not gel until it is homogenized, packaged and cooled to about 5° C.

The method of the present invention comprises the treatment of prepared yogurt with a sterile stabilizer solution under conditions of low pressure homogenization. The stabilizer solution functions to sweeten and gel the yogurt. The stabilizer solutions of the present invention are preferably sterilized by pasteurization, which reduces the risk of microbial contamination which might occur through the addition of dry ingredients and any associated bioburden.

The stabilizer solutions of the present invention are formulated to contain effective amounts of low methoxyl pectin, high methoxyl pectin, artificial sweetener and a calcium ion sequestering salt which may include a minor amount of sodium citrate, which also acts to correct the salt balance of the product in order to prevent granule formation. Preferred aqueous stabilizing solutions for use in the practice of the present invention may be formulated so as to comprise about 3.0–8.0% low methoxyl pectin, about 2.0–7.0% high methoxyl pectin, 0.1–0.75% aspartame, and about 0.2–2.5% sodium hexametaphosphate based on the weight of the stabilizer solution. About 0.5–1.5% of sodium citrate may also be used in the solutions.

These ingredients are added to hot water for rapid hydration, held at an appropriate high temperature and/or pressure for a period sufficient to destroy microbiological contaminents, i.e., at 80°–90° C., 1 atm, 30 min.; and then cooled to the culturing temperature of the yogurt, i.e., to about 40°–50° C.

The stabilizer solution should be mixed with the yogurt by means of a simple blending device which will not incorporate air and which is mechanically simple, so as to be readily maintained in a sterile condition. Any mixing technique may be employed which is effective to achieve the solubilization and dispersion of the components of the stabilizing solution in the yogurt without further heating the yogurt. A preferred low pressure homogenization technique is to blend the solution and the yogurt and to subsequently pass the stabilized yogurt through a compression valve at pressures of about 40–160 psi.

Preferably, the stabilizer solution is mixed with the yogurt in a v/v ratio of stabilizer solution to yogurt of about 1–2.5–8, most preferably 1:3.0–7.5. This achieves final product concentrations of about 0.35–3.0% low methoxyl pectin, 0.25–1.0% high methoxyl pectin, 0.025–0.5% sodium hexametaphosphate, 0.01–0.15% aspartame and optionally, 0.05–0.5% sodium citrate by weight.

Treatment of yogurt with dry or aqueous high methoxyl pectin does not result in complete dissolution of the pectin. Rather, the pectin will hydrate so as to form small visible particles. Through the use of low pressure homogenization at about 40–160 psi the hydrated particles break into even smaller particles that are still visible. Although the high methoxyl pectin is not completely dissolved it will act to coat the casein so as to yield a stable yogurt. While the high methoxyl pectin will inhibit any protein precipitation in the yogurt, it will not increase the viscosity sufficiently to produce a gelled product.

The use of low methoxyl pectin and calcium sequestering agents such as sodium hexametaphosphate and sodium citrate along with the high methoxyl pectin will yield a gelled yogurt that achieves a "second set" after the low pressure homogenization. The low methoxyl pectin acts as a gelling agent, while the sodium hexametaphosphate and optional sodium citrate regulate the rate at which gelling will occur. By varying the total amount of sodium hexametaphosphate and sodium citrate the gelling reaction of the yogurt can be slowed so that the product can be passed through the low pressure homogenization and packaged before becoming too viscous to easily handle. In general, it has been found that a ratio of low methoxyl pectin to sodium hexametaphosphate and sodium citrate of about 1.5–4.5:1, and preferably about 3.5–4.5:1 yields the optimal gellation rate within the effective concentration range of the components.

Yogurt produced according to this invention will be of smooth texture and mouthfeel, be physically stable and free from off-flavor or colors that could be attributed to the stabilizer additives.

Aspartame or other aspartic acid-based artificial sweeteners that are pH sensitive or are metabolized by the culture or otherwise inhibit the culture must be added to the yogurt only after the culturing of the dairy ingredients has been completed. If aspartame, for example, is added with the dairy ingredients prior to culturing, the final sweetness may be lessened due to the degradation the sweetener as the bacterial cultures react with the lactose to produce lactic acid. Aspartame is most stable in products having a pH 3.0 to 5.0 while uncultured dairy products, in general, fall in the 6.3–6.9 pH range. At this pH and the commonly employed culturing temperatures (40°–50° C.) aspartame would tend to break down to diketopiperazine (DKP) causing a decrease in sweetness. If, however, the aspartame is added to the yogurt as a portion of the stabilizer at a yogurt pH of about 4–5, preferably of about 4.2 to 4.6, little breakdown occurs.

Clumping is another problem associated with aspartame. The finely powdered sweetener will form globules that hydrate on their external surface, but will remain dry internally. These globules will eventually dissolve but only after a significant period of time and agitation. This problem is avoided by mixing the aspartame with the pectins and adding it to the yogurt in an aqueous solution. The solubility of aspartame increases with temperature, therefore, the heating and agitation involved in the pasteurization of the stabilizer solution is effective in dissolving the sweetener as well as the pectins.

Other synthetic aspartic acid-based sweeteners are also useful in the practice of the present invention. Such sweeteners are described by R. H. Mazur, in Aspartic Acid-Based Sweeteners, in *Symposium: Sweeteners*, G. E. Inglett, Ed., AVI Pub., Westport, Ct. (1974) at chapter 14, the disclosure of which is incorporated herein by reference. It is also within the scope of the present invention to employ aspartic acid-based sweeteners in admixture with other synthetic sweeteners such as saccharine or cyclamates. A firm gelled yogurt that is sweetened with aspartame can be prepared from the present invention that will not exhibit syneresis or graininess for approximately 4 to 6 weeks at refrigeration temperatures.

The present invention will be further described by reference to the following detailed examples.

EXAMPLE 1

Preparation Of Liquid Yogurt Sweetened With Aspartame

Nonfat dry milk powder and water were blended in proportions necessary to give the desired percentage of nonfat milk solids. This mixture was heated to 82° C. for 30 minutes, cooled to 45° C., inoculated with the bacterial culture and incubated without agitation at 45° C. for four to six hours or to about a pH of 4.2, and 0.9% w/w lactic acid. The curd was broken by agitation and held at 45° C. until the stabilizer solution was added.

Aspartame, high methoxyl pectin and water were blended with agitation and heated to 82° C. for 30 minutes to form a final solution containing by weight, 7.0% high methoxyl pectin and 0.5% aspartame. This solution was cooled to 45° C. and added to the yogurt in a v/v ratio of solution to yogurt of 1:6.0 with agitation. The final concentration of aspartame in the yogurt mix was 0.07% and the high methoxyl pectin concentration was 1.0%. The stabilized yogurt was passed through a sterilized compression valve at 60 psi, and packaged into 8-oz. cups, heat sealed and refrigerated overnight.

Samples of the product were evaluated as acceptable in sweetness with no bitter aftertaste. No flavor carry or sour aftertaste was detected.

The yogurt was pourable after one week of refrigerated storage.

EXAMPLE 2

Effects Of Pasteurization On Aspartame

To determine the effect of pasteurization on the sweetness imparted by aspartame, liquid yogurt was prepared as in Example 1. This was compared to yogurt in which the aspartame was added in dry form to the pasteurized stabilizer solution. Both products were passed through low pressure homogenization, packaged into cups and held at refrigeration temperatures overnight.

Organoleptic evaluation of the yogurt did not reveal any loss of sweetness due to the pasteurization temperatures utilized in this invention.

EXAMPLE 3

Gelled, Aspartame-Sweetened Yogurt

To produce a gelled yogurt sweetened with aspartame that exhibited a smooth, homogeneous texture, an electronegative gelling agent was utilized.

Yogurt was prepared as in Example 1 to contain 15.20% nonfat milk solids. An aqueous stabilizer solution was prepared to contain varying amounts of high methoxyl pectin, low methoxyl pectin, sodium hexametaphosphate, sodium citrate and aspartame. These ingredients were dry blended and added with agitation to hot water. The resulting solution was heated to 82° C. for 30 minutes for pasteurization and cooled to about 45° C. The stabilizer solution was mixed with the prepared yogurt in the indicated v/v ratio at 45° C. with agitation and homogenized at low pressure through a compression valve. The action of low pressure homogenization aids in the solubilization of the pectin in the yogurt. The effects of various levels of high methoxyl pectin, low methoxyl pectin, aspartame, sodium hexametaphosphate and citrate are outlined in Table 1.

TABLE 1
EFFECTS OF VARIOUS STABILIZER SYSTEMS IN OBTAINING A GEL

| EX. 3 | STABILIZER SOLUTION COMPONENTS | % CONCENTRATION IN FINISHED PRODUCT+ | STABILIZER SOLUTION/ YOGURT RATIO | OVERNIGHT STABILITY | TEXTURE |
|---|---|---|---|---|---|
| A | High Methoxyl Pectin | 1.0 | 1:5.6 | Good | Fluid |
| B | Low Methoxyl Pectin | 0.60 | 1:5.8 | Good | Pudding-like |
|   | High Methoxyl Pectin | 0.40 | | | |
|   | Sodium Hexametaphosphate | 0.05 | | | |
| C | Low Methoxyl Pectin | 1.20 | 1:4.4 | — | Spoonable Grainy |
|   | Sodium Hexametaphosphate | 0.30 | | | |
| D | Low Methoxyl Pectin | 1.50 | 1:3.5 | Syneresis | Thick, Tapioca-like, Clumpy |
|   | Sodium Hexametaphosphate | 0.38 | | | |
| E | Low Methoxyl Pectin | 0.90 | 1:5.87 | — | Thin, Watery |
|   | Sodium Hexametaphosphate | 0.23 | | | |
| F | Low Methoxyl | 0.60 | 1:5.6 | No Syneresis | Spoonable but |

TABLE 1-continued
EFFECTS OF VARIOUS STABILIZER SYSTEMS IN OBTAINING A GEL

| EX. 3 | STABILIZER SOLUTION COMPONENTS | % CONCENTRATION IN FINISHED PRODUCT+ | STABILIZER SOLUTION/ YOGURT RATIO | OVERNIGHT STABILITY | TEXTURE |
|---|---|---|---|---|---|
| | Pectin | | | | Grainy |
| | High Methoxyl Pectin | 0.40 | | | |
| | Sodium Hexametaphosphate | 0.15 | | | |
| G | Low Methoxyl Pectin | 1.39 | 1:3.5 | Sight Syneresis | Heavy Gel Conformed to sides of cup |
| | High Methoxyl Pectin | 0.69 | | | |
| | Sodium Hexametaphosphate | 0.35 | | | |
| H | Low Methoxyl Pectin | 1.39 | 1:3.5 | Slight Syneresis | Rigid but not as firm as System (G) |
| | High Methoxyl Pectin | 0.69 | | | |
| | Sodium Hexametaphosphate | 0.18 | | | |
| I | Low Methoxyl Pectin | 1.04 | 1:3.5 | No Syneresis | Creamy, Rigid Gel |
| | High Methoxyl Pectin | 0.69 | | | |
| | Sodium Hexametaphosphate* | 0.26 | | | |
| J | Low Methoxyl Pectin | 0.75 | 1:7.0 | No Syneresis | Soft Gel, Creamy |
| | Sodium Hexametaphosphate | 0.26 | | | |
| | High Methoxyl Pectin | 0.69 | | | |
| | Sodium Citrate | 0.15** | | | |
| K | Low Methoxyl Pectin | 1.04 | 1:4.9 | No Syneresis | Spoonable, Good, Thick |
| | High Methoxyl Pectin | 0.69 | | | |
| | Sodium Hexametaphosphate | 0.26 | | | |
| | Sodium Citrate | 0.15** | | | |
| L | Sodium Alginate | 1.04 | 1:5.0 | — | No Thickening Noticed |
| | Sodium Hexametaphosphate | 0.26 | | | |
| | High Methoxyl Pectin | 0.59 | | | |

*Optimum stabilizer systems for gelled yogurt.
**Sodium citrate was added to correct a salt imbalance that was causing a grainy product.
+Exs. 3A–E contained 0.07% aspartame; Exs. 3F–L contained 0.05% aspartame. All examples contained 5.7% fruit flavoring.

The data presented above (Exs. 3B, G, H, I, J and K) show that in proper combinations, high methoxyl pectin, low methoxyl pectin, sodium hexametaphosphate and, optionally, sodium citrate are effective in smoothly gelling the yogurt in the presence of aspartame after packaging and cooling to 5° C.

EXAMPLE 4
Results Of Using Nonfat, Lowfat, Or Whole Milk To Produce A Gelled Yogurt Yogurts containing different levels of butterfat were prepared using the stabilizer system described in Example 3J. Table 2 illustrates that an acceptable gelled yogurt can be produced with various types of dairy ingredients. Yogurt containing less than 0.5% fat (nonfat), 3.25% fat (whole milk), and 1.0% fat (lowfat) milk was prepared following the procedures outlined in Example 3.

TABLE 2

| TYPE OF YOGURT | BOSTWICK CONSISTOMETER MEASUREMENT (7° C.) | TEXTURE |
| --- | --- | --- |
| Nonfat | .7 cm/30 sec. | Creamy, Smooth, Firm enough to mold to shape of cup |
| Lowfat | .5 cm/30 sec. | Creamy, Pudding like smooth |
| Whole Milk | 1.5 cm/30 sec. | Good, Spoonable, Smooth |

EXAMPLE 5

Pilot Plant Production Of Gelled Yogurt

To produce an unflavored yogurt, 2.96 lb. of nonfat dry milk powder and 12.65 lb. of water were blended in a steam jacketed kettle and heated with agitation to 82° C. for 30 minutes for pasteurization. The dairy mix was cooled to 45° C., and a packet of freeze-dried culture was added through an opening in the cover of the kettle. After about five minutes of agitation the agitator was turned off and the mix was held at 45° C. for 4.5 hours to allow the culture to produce acid. After culturing to 0.95% w/w lactic acid, the yogurt was stirred and held at 45° C.

While culturing the milk portion, the pectin solution was prepared. The following ingredients were dry blended in a container: 0.19 lb. low methoxyl pectin, 0.13 lb. high methoxyl pectin, 0.01 lb. aspartame, and 0.05 lb. sodium hexametaphosphate and the blend was added to 3.50 lb. heated water with agitation. The solution was heated to 82° C. for 30 minutes to pasteurize the ingredients. This solution was cooled to 45° C. before being mixed with the yogurt.

The resultant solution contained 4.9% low methoxyl pectin, 3.35% high methoxyl pectin, 1.29% sodium hexametaphosphate and 0.26% aspartame by weight.

The pectin solution was mixed with the yogurt at 45° C. with agitation. The stabilized yogurt was then pumped through a compression valve at 60 psi into a sterilized container and the yogurt was packaged into individual 6 oz. containers, and cooled to 5° C. overnight.

The resulting yogurt contained less than 0.5% milk fat, 15.0% nonfat milk solids, 1.10% low methoxyl pectin, 0.73% high methoxyl pectin, 0.28% sodium hexametaphosphate, and 0.053% aspartame. The yogurt was of smooth, creamy texture that exhibited no syneresis or graininess. It was firm enough to hold the shape of its container when emptied out and flowed at 0.7 centimeters/30 seconds on a Bostwick consistometer at 7° C. There was a characteristic sheen to the surface of the yogurt and a sweet fruity taste characteristic of fine sweetened yogurt made by the traditional "cultured in the cup" method.

EXAMPLE 6

Gelled, Sweetened Yogurt With Fruit

A batch of the gelled yogurt was prepared in the same manner as in Example 5, and 6% of an unsweetened pasteurized strawberry fruit preparation was aseptically added to this batch.

The fruit was aseptically placed in the bottom of a cup and the 45° C. yogurt filled on top as it flowed from the compression valve. The cup was placed in the refrigerator and allowed to cool to 7° C.

The "sundae" style yogurt that resulted was evaluated organoleptically to be of a high quality with a clean strawberry aroma and sweet flavor. The yogurt did not combine with the fruit after storage and no bleeding of the fruit into the yogurt was noticed. When stirred, the plain yogurt became a pink color with a smooth creamy texture that had a pudding-like mouthfeel.

The sweetness of the yogurt was similar to that of a sugar sweetened product with no aftertaste and approximately half of the calories. Yogurt made by the conventional method with natural sweeteners has 200-300 calories per 8 oz. serving while yogurt with aspartame could reduce the calories to 90-150 calories per serving.

EXAMPLE 7

Two batches of yogurt were prepared in which lowfat milk at 0.5-1.0% fat and whole milk at 3.25% milk fat were utilized. This experiment illustrates the effectiveness of the low methoxyl/high methoxyl stabilizer system in products with varied composition.

The yogurt was prepared in the same manner as Example 5 and flavored with the fruit as in Example 6.

Both products were acceptable in texture and flavor and exhibited similar viscosities as that in Example 5. The yogurt products were creamy, with a full mouthfeel. No syneresis was noted and the yogurt exhibited a shiny surface appearance. When mixed with the strawberry fruit preparations a smooth interface was noted between the yogurt and the fruit in the sundae style package.

The yogurt resulting from this invention is different from conventional sundae style yogurt in that it contains fewer calories and is stabilized after incubation. Nevertheless, it is not necessary to mix the yogurt according to the invention with the fruit prior to consumption since the yogurt can be prepared as a sundae style rather than a mixed or Swiss style yogurt. It also contains no pathogens or spoilage organisms, due to the pasteurization of all of the ingredients, and so exhibits a longer shelflife than conventional products.

We claim:

1. A method for preparing a gelled, sweetened yogurt comprising the steps of:
    combining in the presence of water a mixture comprising (a) an amount of high methoxyl pectin effective to inhibit protein precipitation in a yogurt, (b) an amount of low methoxyl pectin effective to gel a yogurt, and (c) an effective amount of a sweetener comprising an aspartic acid-derived sweetener; to yield a sweetened stabilizing solution;
    pasteurizing said sweetened stabilizing solution to yield a pasteurized sweetened stabilizing solution; and
    mixing said pasteurized sweetened stabilizing solution with prepared yogurt.

2. The method for preparing a gelled sweetened yogurt in accordance with claim 1 wherein said mixture further comprises an amount of calcium ion sequestering agent sufficient to retard the gellation of the yogurt during homogenization and packaging.

3. The method for preparing a gelled sweetened yogurt in accordance with claim 1 wherein said pastuerizing step comprises:
  maintaining said sweetened stabilizing solution at a temperature of approximately between 80°–90° C. for a sufficient period of time to destroy microbiological contaminants.

4. The method of claim 1 wherein the sweetener comprises aspartame.

5. The method of claim 2 wherein the calcium ion sequestering agent is sodium hexametaphosphate, sodium citrate, EDTA or mixtures thereof.

6. The method of claim 1 wherein the stabilizing solution comprises about 3–8% low methoxyl pectin, about 2.0–7.0% high methoxyl pectin, about 0.2–2.5% sodium hexametaphosphate and about 0.1–0.75% aspartame and wherein the stabilizing solution is mixed with the prepared yogurt in a volume to volume ratio of solution to yogurt of about 1:3–7.5.

7. The method of claim 6 wherein the stabilizing solution further comprises an amount of sodium citrate effective to correct the salt balance of the gelled yogurt.

8. The method of claim 1 further comprising adding unsweetened fruit to the homogenized yogurt.

9. The method of claim 1 wherein the pH of the prepared yogurt is about 4–5.

10. The method of claim 5 wherein the ratio of low methoxyl pectin to calcium ion sequestering agent is about 1:5–4.5:1.

11. The method of claim 10 wherein the stabilizing solution comprises about 3.0–8.0% low methoxyl pectin, about 0.2–2.5% sodium hexametaphosphate and 0–1.5% sodium citrate, and wherein the stabilizing solution is mixed with the prepared yogurt in a volume to volume ratio of solution to yogurt of about 1–2.5–8.

* * * * *